US012375845B2

(12) United States Patent
Park et al.

(10) Patent No.: US 12,375,845 B2
(45) Date of Patent: Jul. 29, 2025

(54) AUDIO OUTPUT DEVICE INCLUDING EXTENDED RESONANCE SPACE AND ELECTRONIC DEVICE INCLUDING THE SAME

(71) Applicant: Samsung Electronics Co., Ltd., Suwon-si (KR)

(72) Inventors: Chamin Park, Suwon-si (KR); Jonghong Kim, Suwon-si (KR); Cheongno Yun, Suwon-si (KR); Soojung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 18/329,074

(22) Filed: Jun. 5, 2023

(65) Prior Publication Data

US 2024/0031734 A1 Jan. 25, 2024

Related U.S. Application Data

(63) Continuation of application No. PCT/KR2023/004875, filed on Apr. 11, 2023.

(30) Foreign Application Priority Data

Jul. 22, 2022 (KR) ........................ 10-2022-0091326
Aug. 24, 2022 (KR) ........................ 10-2022-0106490

(51) Int. Cl.
*H04R 1/28* (2006.01)
*H04R 1/02* (2006.01)

(52) U.S. Cl.
CPC ........... *H04R 1/2849* (2013.01); *H04R 1/023* (2013.01); *H04R 1/028* (2013.01); *H04R 1/2803* (2013.01); *H04R 2499/11* (2013.01)

(58) Field of Classification Search
CPC ...... H04R 1/2849; H04R 1/023; H04R 1/028; H04R 1/2803; H04R 2499/11
See application file for complete search history.

(56) References Cited

U.S. PATENT DOCUMENTS 8,335,333 B2 12/2012 Saiki et al.
10,057,678 B2 8/2018 Kwon et al.
(Continued)

FOREIGN PATENT DOCUMENTS

KR 10-2009-0087995 A 8/2009
KR 10-2017-0081136 A 7/2017
(Continued)

OTHER PUBLICATIONS

Samsung Galaxy A73 5G—Full phone specifications.[online]. Mar. 17, 2022. pp. 1-12. [Retrieved on Jul. 22, 2022], Retrieved from <https://m.gsmarena.com/samsung_galaxy_a73_5g-11257.php>.
(Continued)

*Primary Examiner* — Mark Fischer
(74) *Attorney, Agent, or Firm* — Jefferson IP Law, LLP

(57) ABSTRACT

An audio output device is provided. The audio output device includes a speaker, a case surrounding the speaker and including a first opening connected to the resonance space within the case, a plurality of air adsorbents disposed within the speaker, an adhesive member disposed on the first opening and including a second opening overlapping the first opening, and a mesh layer disposed on the adhesive member and covering the second opening. A diameter of the first opening is larger than a diameter of each of the plurality of air adsorbents, and a diameter of the second opening is smaller than the diameter of the first opening.

20 Claims, 8 Drawing Sheets

(56) References Cited

U.S. PATENT DOCUMENTS

| | | | | |
|---|---|---|---|---|
| 10,349,167 | B2 | 7/2019 | Wilk et al. | |
| 10,382,859 | B2 | 8/2019 | Lembacher et al. | |
| 11,356,767 | B2 | 6/2022 | Cho et al. | |
| 11,488,570 | B2 | 11/2022 | Feng et al. | |
| 11,832,050 | B2 | 11/2023 | Sauer et al. | |
| 2009/0028370 | A1* | 1/2009 | Matsumura ............ | H04R 3/002<br>381/86 |
| 2017/0195781 | A1 | 7/2017 | Kang et al. | |
| 2020/0288235 | A1 | 9/2020 | Wilk et al. | |
| 2021/0037312 | A1 | 2/2021 | Cho et al. | |
| 2021/0037313 | A1 | 2/2021 | Cho et al. | |
| 2023/0095381 | A1 | 3/2023 | Park et al. | |

FOREIGN PATENT DOCUMENTS

| | | | |
|---|---|---|---|
| KR | 10-1788110 | B1 | 10/2017 |
| KR | 10-2019-0097926 | A | 8/2019 |
| KR | 10-2036752 | B1 | 10/2019 |
| KR | 10-2021-0015557 | A | 2/2021 |
| KR | 10-2022-0102442 | A | 7/2022 |

OTHER PUBLICATIONS

International Search Report dated Jul. 25, 2023, issued in International Application No. PCT/KR2023/004875.

* cited by examiner

AUDIO OUTPUT DEVICE INCLUDING EXTENDED RESONANCE SPACE AND ELECTRONIC DEVICE INCLUDING THE SAME

CROSS-REFERENCE TO RELATED APPLICATION(S)

This application is a continuation application, claiming priority under § 365(c), of an International application No. PCT/KR2023/004875, filed on Apr. 11, 2023, which is based on and claims the benefit of a Korean patent application number filed on Jul. 22, 2022, in the Korean Intellectual Property Office, of a Korean patent application number 10-2022-0106490, filed on Aug. 24, 2022, in the Korean Intellectual Property Office, the disclosure of each of which is incorporated by reference herein in its entirety.

TECHNICAL FIELD

The disclosure relates to an audio output device including an extended resonance space and an electronic device including the same.

BACKGROUND ART

The size of portable electronic devices is getting smaller. The portable electronic device may include an audio output device for providing audio. The audio output device may transmit an audio signal along an audio path. The audio output device may include a resonance space to generate an audio signal of a low frequency band.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an audio output device including an extended resonance space and an electronic device including the same.

Additional aspects will be set forth in part in the description which follows and, in part, will be apparent from the description, or may be learned by practice of the presented embodiments.

In accordance with an aspect of the disclosure, an audio output device is provided. The audio output device includes a speaker, a case surrounding the speaker and including a resonance space in the case and a first opening connected to the resonance space, a plurality of air adsorbents disposed within the speaker, an adhesive member surrounding the first opening and including a second opening overlapping the first opening, and a mesh layer attached to the case by the adhesive member and covering the second opening. A diameter of the first opening may be larger than a diameter of each of the plurality of air adsorbents. The diameter of the second opening may be smaller than the diameter of the first opening.

In accordance with another aspect of the disclosure, an electronic device is provided. The electronic device includes a housing including a speaker hole disposed on a side surface, a speaker module in the housing, the speaker module including a speaker, a case surrounding the speaker including a resonance space in the case and a first opening connected to the resonance space, a plurality of air adsorbents disposed within the speaker, an adhesive member disposed on the first opening and including a second opening overlapping the first opening, a mesh layer, and an audio duct configured to transmit an audio signal from the speaker module through the speaker hole, wherein the diameter of the first opening is larger than the diameter of each of the plurality of air adsorbents, and the diameter of the second opening is smaller than the diameter of the first opening.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
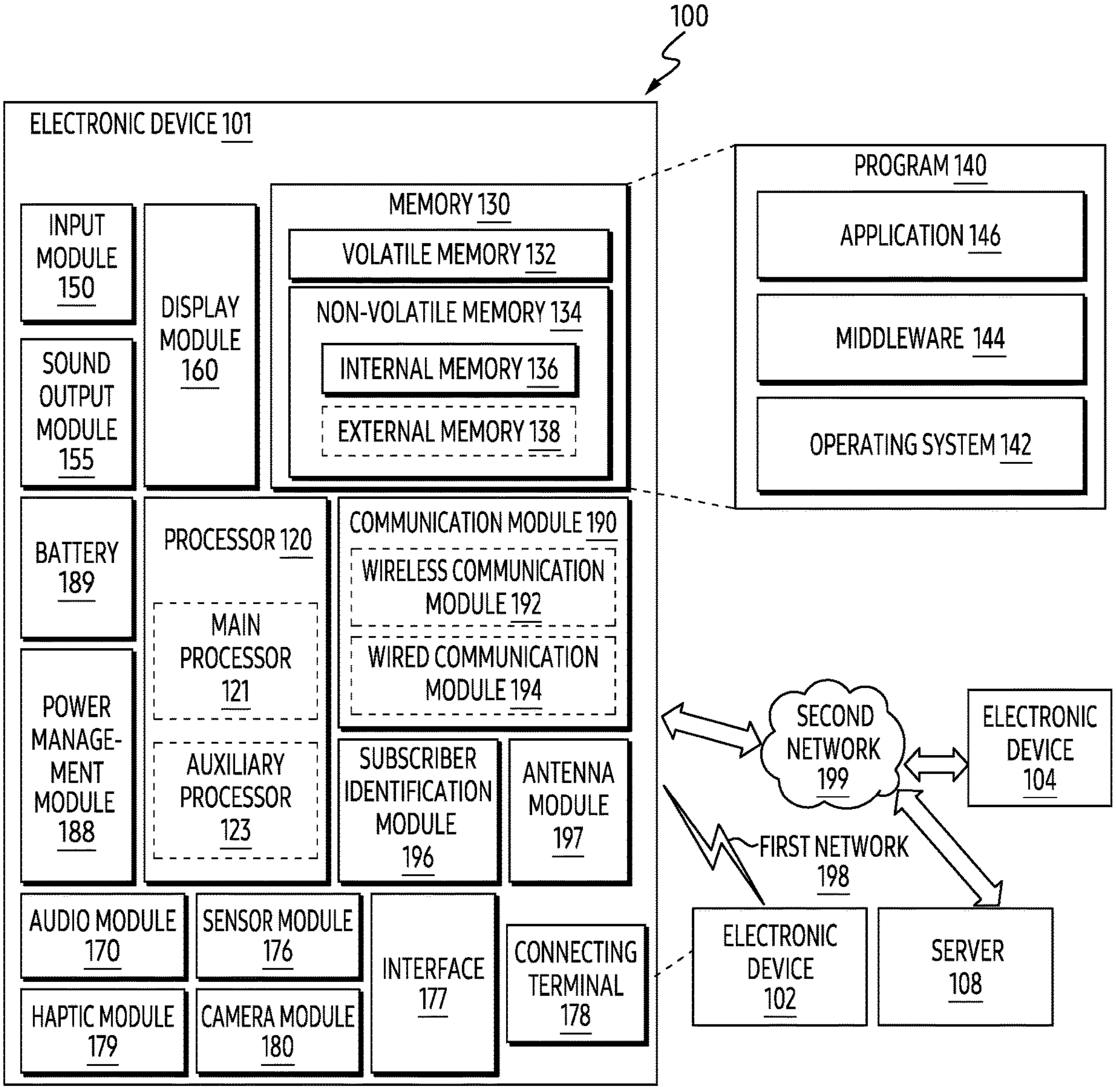
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
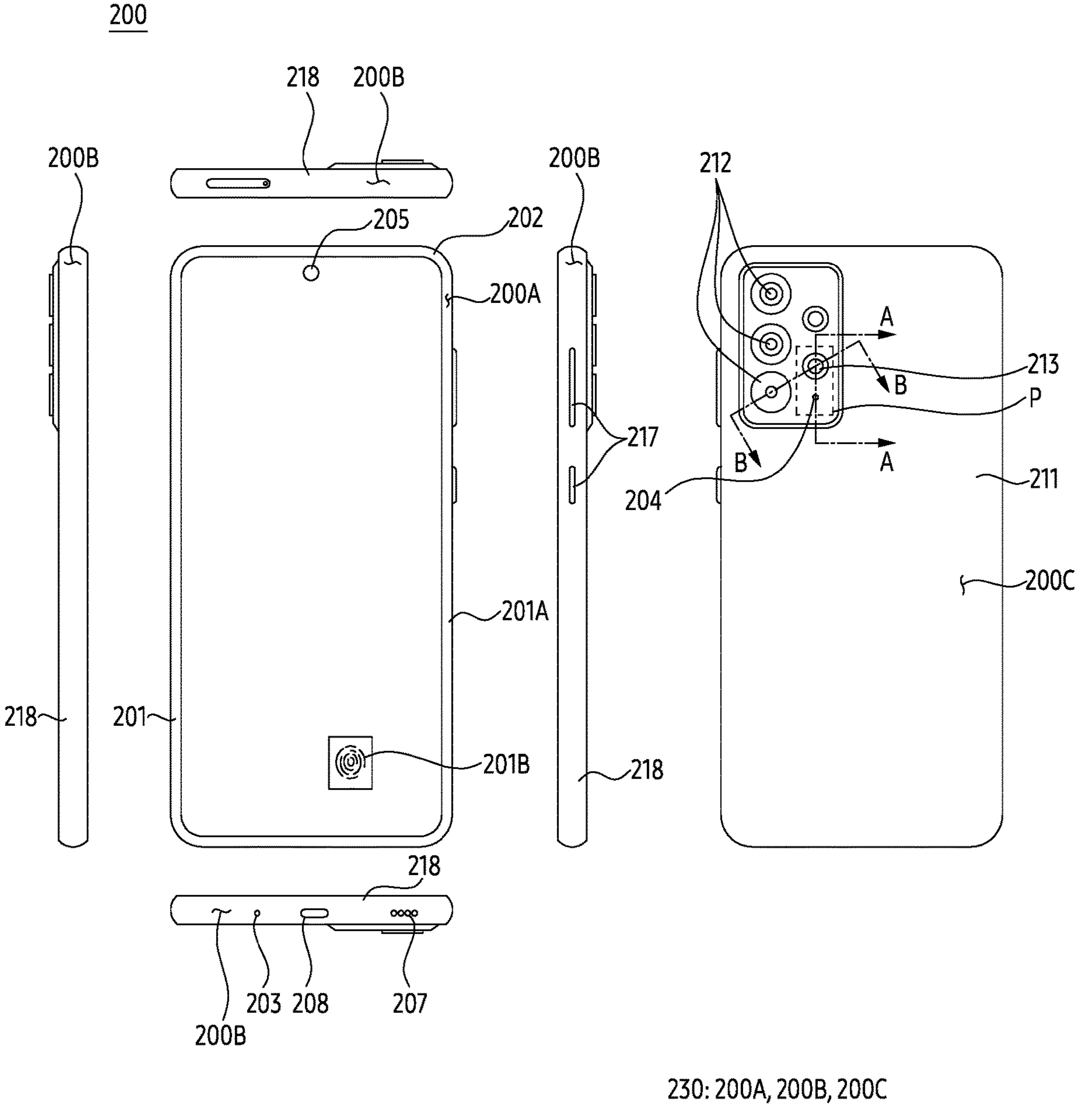
FIG. 2 is a diagram illustrating an electronic device according to an embodiment of the disclosure.
Figure 3:
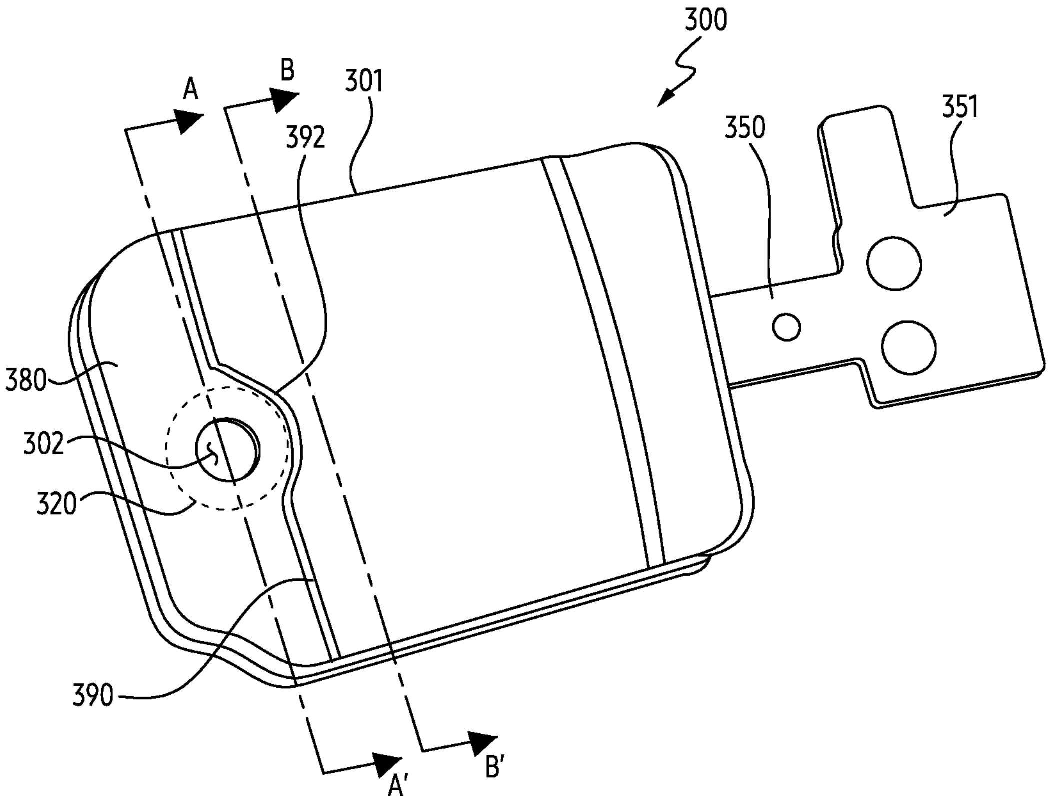
FIG. 3 is a diagram illustrating an audio output device according to an embodiment of the disclosure.

FIG. 2 is a diagram illustrating an example electronic device according to an embodiment of the disclosure, and FIG. 3 is an exploded perspective view of an electronic device according to an embodiment of the disclosure.

Referring to FIG. 2, an electronic device 200 (e.g., an electronic device 101 of FIG. 1) according to an embodiment of the disclosure may include a housing 230 forming an exterior of the electronic device 200. For example, the housing 230 may include a first surface (or a front surface) 200A, a second surface (or a rear surface) 200C, and a third surface (or a side surface) 200B surrounding a space between the first surface 200A and the second surface 200C. The housing 230 may refer to a structure (e.g., a frame structure of FIG. 3) forming at least a portion of the first surface 200A, the second surface 200C, and/or the third surface 200B.

The electronic device 200 according to an embodiment may include a substantially transparent front plate 202. The front plate 202 may form at least a portion of the first surface 200A. The front plate 202 may include, for example, a glass plate including various coating layers or a polymer plate, but is not limited thereto.

The electronic device 200 may include a substantially opaque rear plate 211. The rear plate 211 may form at least a portion of the second surface 200C. The rear plate 211 may be formed of coated or colored glass, ceramic, polymer, metal (e.g., aluminum, stainless steel (STS), or magnesium), or a combination of at least two of the above materials.

The electronic device 200 may include a side bezel structure (or side member) 218 (e.g., a side wall of a frame structure of FIG. 3). The side bezel structure 218 may be coupled to the front plate 202 and/or the rear plate 211 to form at least a portion of the third surface 200B of the electronic device 200. For example, the side bezel structure 218 may form all of the third surface 200B of the electronic device 200. In another example, the side bezel structure 218 may form the third surface 200B of the electronic device 200 together with the front plate 202 and/or the rear plate 211.

According to another embodiment of the disclosure, when the third surface 200B of the electronic device 200 is partially formed by the front plate 202 and/or the rear plate 211, the front plate 202 and/or the rear plate 211 may include a region that is bent from a periphery thereof toward the rear plate 211 and/or the front plate 202 and seamlessly extends. The extended region of the front plate 202 and/or the rear plate 211 may be positioned at both ends of, for example, a long edge of the electronic device 200, but is not limited to the above-described examples.

The side bezel structure 218 may include a metal and/or a polymer. The rear plate 211 and the side bezel structure 218 may be integrally formed and may include the same material (e.g., a metal material such as aluminum), but are not limited thereto. For example, the rear plate 211 and the side bezel structure 218 may be formed in separate configurations and/or may include different materials.

The electronic device 200 may include at least one of a display 201, an audio module 203, 204, 207, a sensor module (not illustrated), a camera module 205, 212, 213, a key input device 217, a light emitting device (not illustrated), and/or a connector hole 208. The electronic device 200 may omit at least one of the components (e.g., a key input device 217 or a light emitting device (not illustrated)), or may further include another component.

The display 201 (e.g., a display module 160 of FIG. 1) may be visually exposed (e.g., visible. The terms "visually exposed", "exposed" and "visible" may be used interchangeably herein) through a substantial portion of the front plate 202. For example, at least a portion of the display 201 may be visible through the front plate 202 forming the first surface 200A. The display 201 may be disposed on the rear surface of the front plate 202.

The appearance of the display 201 may be substantially the same as the appearance of the front plate 202 adjacent to the display 201. In order to expand the area in which the display 201 is visually exposed, the distance between the outside of the display 201 and the outside of the front plate 202 may be formed to be generally the same.

The display 201 (or the first surface 200A of the electronic device 200) may include a screen display area 201A. In an embodiment, the display 201 may provide visual information to a user through the screen display area 201A. In the illustrated embodiment, when the first surface 200A is viewed from the front, it is illustrated that the screen display area 201A is spaced apart from the outside of the first surface 200A and is positioned inside the first surface 200A, but it is not limited thereto. When the first surface 200A is viewed from the front, at least a portion of the periphery of the screen display area 201A may substantially coincide with the periphery of the first surface 200A (or the front plate 202).

According to an embodiment of the disclosure, the screen display area 201A may include a sensing area 201B configured to obtain biometric information of a user. The phrase "the screen display area 201A includes the sensing area 201B" may be understood to refer, for example, to at least a portion of the sensing area 201B may be overlapping the screen display area 201A. For example, the sensing area 201B, like other areas of the screen display area 201A, may refer to an area in which visual information may be displayed by the display 201 and additionally biometric information (e.g., fingerprint) of a user may be obtained. According to another embodiment of the disclosure, the sensing area 201B may be formed in the key input device 217.

The display 201 may include an area in which the first camera module 205 (e.g., a camera module 180 of FIG. 1) is positioned. An opening may be formed in the area of the display 201, and the first camera module 205 (e.g., a punch hole camera) may be at least partially disposed in the opening to face the first surface 200A. In this case, the screen display area 201A may surround at least a portion of the periphery of the opening. The first camera module 205 (e.g., an under display camera (UDC)) may be disposed under the display 201 to overlap the area of the display 201. In this case, the display 201 may provide visual information to the user through the area, and additionally, the first camera module 205 may obtain an image corresponding to a direction facing the first surface 200A through the area of the display 201.

The display 201 may be coupled to or disposed adjacent to a touch sensing circuit, a pressure sensor capable of measuring the intensity (pressure) of the touch, and/or a digitizer that detects a magnetic field type stylus pen.

The audio modules 203, 204 and 207 (e.g., an audio module 170 of FIG. 1) may include microphone holes 203 and 204 and a speaker hole 207.

The microphone holes 203 and 204 may include a first microphone hole 203 formed in a partial area of the third surface 200B and a second microphone hole 204 formed in a partial area of the second surface 200C. A microphone (not illustrated) for obtaining an external sound may be disposed inside the microphone holes 203 and 204. The microphone may include a plurality of microphones to detect the direction of sound.

The second microphone hole 204 formed in a partial area of the second surface 200C may be disposed adjacent to the camera modules 205, 212 and 213. For example, the second microphone hole 204 may obtain sound according to operations of the camera modules 205, 212, and 213. However, it is not limited thereto.

The speaker hole 207 may include an external speaker hole 207 and a receiver hole (not illustrated) for a call. The external speaker hole 207 may be formed on a portion of the third surface 200B of the electronic device 200. The external speaker hole 207 may be implemented as one hole with the microphone hole 203. A receiver hole (not illustrated) for a call may be formed on another portion of the third surface 200B. For example, the receiver hole for a call may be formed on the opposite side of the external speaker hole 207 on the third surface 200B. For example, based on the illustration of FIG. 2, the external speaker hole 207 may be formed on the third surface 200B corresponding to the lower end of the electronic device 200, and the receiver hole for a call may be formed on the third surface 200B corresponding to the upper end of the electronic device 200. However, the disclosure is not limited thereto, and the receiver hole for a call may be formed at a position other than the third surface 200B. For example, the receiver hole for a call may be formed by a space spaced apart between the front plate 202 (or display 201) and the side bezel structure 218.

The electronic device 200 may include at least one speaker (not illustrated) configured to output sound to the outside of the housing 230 through an external speaker hole 207 and/or a receiver hole (not illustrated) for a call.

The sensor module (not illustrated) (e.g., the sensor module 176 of FIG. 1) may generate an electrical signal or data value corresponding to an internal operating state or an external environmental state of the electronic device 200. For example, the sensor module may include at least one of a proximity sensor, a heart rate monitor (HRM) sensor, a fingerprint sensor, a gesture sensor, a gyro sensor, a pressure sensor, a magnetic sensor, an acceleration sensor, a grip sensor, a color sensor, an infrared (IR) sensor, a biometric sensor, a temperature sensor, a humidity sensor, and an illumination sensor.

The camera modules 205, 212 and 213 (e.g., a camera module 180 of FIG. 1) may include a first camera module 205 disposed to face the first surface 200A of the electronic device 200, a second camera module 212 disposed to face the second surface 200C, and a flash 213.

The second camera module 212 may include a plurality of cameras (e.g., a dual camera, a triple camera, or a quad camera). However, the second camera module 212 is not necessarily limited to including a plurality of cameras, and may include one camera.

The first camera module 205 and the second camera module 212 may include one or a plurality of lenses, an image sensor, and/or an image signal processor.

The flash 213 may include, for example, a light emitting diode or a xenon lamp. Two or more lenses (infrared camera, wide-angle and telephoto lens) and image sensors may be disposed on one side of electronic device 200.

The key input device 217 (e.g., an input module 150 of FIG. 1) may be disposed on the third surface 200B of the electronic device 200. According to an embodiment of the disclosure, some or all of the key input devices 217 may be omitted; the omitted key input device 217 may be implemented on the display 201 in another form, such as a soft key.

The connector hole 208 may be formed on the third surface 200B of the electronic device 200 to accommodate the connector of the external device. A connection terminal (e.g., a connection terminal 178 of FIG. 1) electrically connected to the connector of the external device may be disposed in the connector hole 208. The electronic device 200 may include an interface module (e.g., an interface 177 of FIG. 1) for processing electrical signals transmitted and received through the connection terminal.

The electronic device 200 may include a light emitting device (not illustrated). For example, the light emitting device (not illustrated) may be disposed on the first surface 200A of the housing 230. The light emitting device (not illustrated) may provide state information of the electronic device 200 in a form of light. In an embodiment, the light emitting device (not illustrated) may provide a light source when the first camera module 205 is operated. For example, the light emitting device (not illustrated) may include a light emitting diode (LED), an IR LED, and/or a xenon lamp.

To include a plurality of electronic components in a narrow inner space of the electronic device 200, various attempts are being made to increase space efficiency. According to an embodiment, the electronic device 200 may further include an audio output device (e.g., a speaker). The housing 230 may include a speaker hole 207 formed on a side surface. The audio output device may transmit an audio signal to the outside through a sound duct in the housing connected to the speaker hole 207. The audio output device may convert an electrical signal into an audio signal and provide auditory information to the outside. The audio output device may form vibration based on an electrical signal. An audio output device may generate an audio signal based on the vibration. An audio output device may require a resonance space for generating the vibration. Hereinafter, the structure of an audio output device for securing the resonance space will be described in detail with reference to FIGS. 3, 4, 5A, 5B, 6, and 7.

FIG. 3 is a diagram illustrating an audio output device according to an embodiment of the disclosure.

Figure 4:
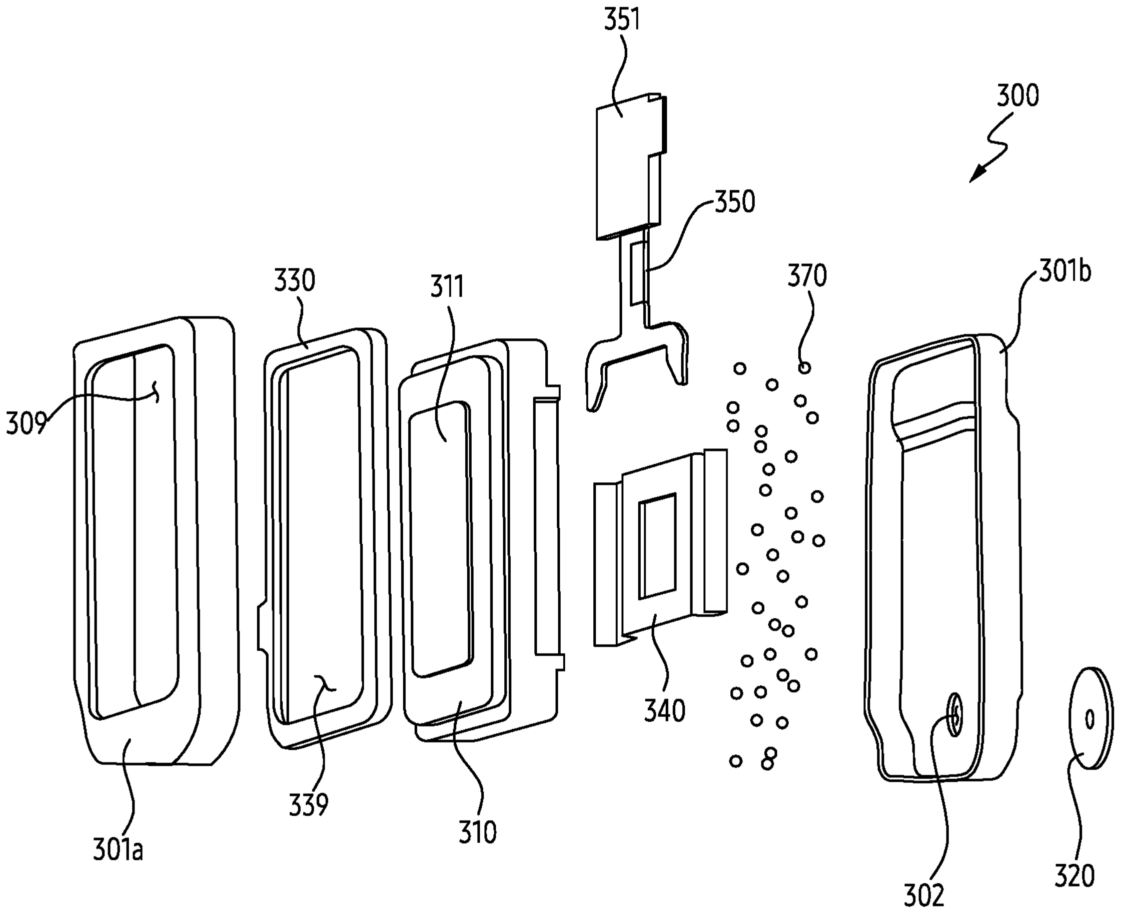
FIG. 4 is an exploded perspective view of an audio output device according to an embodiment of the disclosure.

FIG. 4 is an exploded perspective view of an audio output device according to an embodiment of the disclosure.

Referring to FIGS. 3 and 4, the audio output device 300 may include a case 301, a speaker 310, and a cover 320.

The case 301 may form an outer shape of the audio output device 300. The case 301 may be referred to as an enclosure in a side surface surrounding the speaker 310. The case 301 may include a plurality of enclosures. For example, the case 301 may include a first enclosure 301*a* and a second enclosure 301*b*. The first enclosure 301*a* may surround a front surface of the speaker 310, and the second enclosure 301*b* may surround a rear surface of the speaker 310. The front surface of the speaker 310 may be a surface from which an audio signal (e.g., sound wave) provided through the diaphragm 311 of the speaker is emitted. The rear surface of the speaker 310 may be a surface opposite to the front surface of the speaker 310. The rear surface of the speaker 310 may face the second enclosure 301*b*. The audio output device 300 may generate resonance based on a space between the second enclosure 301*b* and the speaker 310. The space may be referred to as a resonance space in a side surface generating resonance.

The first enclosure 301*a* may include a first audio hole 309 connected to the audio duct. The first audio hole 309 may overlap the diaphragm 311 when viewed from the front surface of the speaker 310. The first audio hole 309 may be disposed along the circumference of the diaphragm 311.

The second enclosure 301*b* may include a first opening 302. The first opening 302 may allow air to enter and exit the case 301. The first opening 302 may adjust the internal pressure of the audio output device 300 based on air introduced into or leaked from the inside of the case 301. The first opening 302 may be a passage through which the air adsorbents 370 are introduced. The air adsorbents 370 may improve audio performance by introducing air into a resonance space.

The speaker 310 may be disposed within the case 301. The speaker 310 may convert an electrical signal into an audio signal that is an analog signal. For example, the speaker 310 may receive an electrical signal through the printed circuit board 350. The speaker 310 may receive an electrical signal related to an audio signal from a processor (e.g., the processor 120 of FIG. 1). The speaker 310 may generate an audio signal based on the electrical signal. The speaker 310 may include the diaphragm 311. The audio signal may be generated by vibration of the diaphragm 311. The vibration plate 311 may generate vibration by interaction between a magnet and a coil inside of the speaker. A force may be applied to the coil by the interaction between the coil to which the current is applied and the magnet. The coil may move based on the applied force. The vibration plate connected to the coil may vibrate through the above movement. The audio output device 300 may generate an audio signal by the vibration. The cover 320 may surround the opening 302 of the second enclosure 301*b*. The cover 320 may be disposed on the first opening 302. The cover 320 may prevent leakage of the plurality of air adsorbents 370 disposed between the second enclosure 301*b* and the speaker 310 by blocking the first opening 302. The cover 320 may include a mesh pattern for introducing or leaking external air through the first opening 302. The cover 320 may include an adhesive material on a surface facing the second enclosure 301*b*. The cover 320 may be attached to the second enclosure 301*b* through the adhesive material. The cover 320 is attached to the second enclosure 301*b* to cover the first opening 302 to prevent the outflow of the plurality of air adsorbents 370 and includes a mesh pattern including fine openings, thereby maintaining the flow of air.

The audio output device 300 may further include an elastic member 330, a support member 340, and air adsorbents 370.

The elastic member 330 may be disposed between the speaker 310 and the first enclosure 301*a*. The elastic member 330 may elastically support the speaker 310 within the case 301. The elastic member 330 may be disposed along the diaphragm 311. The elastic member 330 may include a second audio hole 339. The second audio hole 339 may be connected to the first audio hole 309. The second audio hole 339 and the first audio hole 309 may be connected to the audio duct. An audio signal emitted from the speaker 310 may transfer the audio signal to the outside of the electronic device through the first audio hole 309, the second audio hole 339, and the audio duct. The elastic member 330 may elastically support the vibration plate 311 or may elastically support a structure that presses the vibration plate 311.

The support member 340 may be disposed between the speaker 310 and the second enclosure 301*b*. For example, the support member 340 may separate the speaker 310 from the second enclosure 301*b*. The support member 340 may be disposed in a resonance space between the speaker 310 and the second enclosure 301*b*. The support member 340 may support the speaker 310. The resonance space formed by the support member 340 may provide a space capable of resonating the vibration generated by the speaker 310. The resonance space may provide a wide space to provide sound waves in a low frequency band. The air adsorbents 370 disposed in the resonance space may adsorb air molecules to provide a virtual audio space. The air adsorbents 370 may provide an effect of substantially expanding a resonance space. Through the substantial expansion of the resonance space, the sound pressure level (SPL) in the low band may be improved.

The audio output device 300 may further include a printed circuit board 350. The printed circuit board 350 may be electrically connected to the main board in the electronic device 200. The printed circuit board 350 may be a flexible printed circuit board. One end of the printed circuit board 350 may be connected to the speaker 310, and another end of the printed circuit board 350 may be connected to the connector 351. The connector 351 may be connected to a main substrate in the electronic device 200 or may be connected to another connector connected to the main substrate. The printed circuit board 350 may extend from the speaker 300 in the case 301 to the outside of the case 301.

The case 301 may further include a seating surface 380. The seating surface 380 may be formed outside the case. One surface of the case 301 with the first opening 302 may include a seating surface 380 on which the adhesive member is settled. The first opening 302 may be disposed on the seating surface 380. For example, the seating surface 380 may be formed on the second enclosure 301*b*. The seating surface 380 may be formed on one surface of the second enclosure 301*b* facing the outside of the second audio output device 300. The seating surface 380 may be a surface on which the cover 320 is seated. The case 301 may further include a stepped portion 390. The stepped portion 390 may be formed along the seating surface 380. For example, the seating surface 380 may have a groove that is recessed more than the other surface of the second enclosure 301*b* to accommodate the cover 320. The depth of the groove of the seating surface 380 may correspond to the thickness of the cover 320. The stepped portion 390 may be disposed along a portion of an edge of the cover 320. The stepped portion 390 may extend from one side surface of the case 301 to another side surface opposite to the one side surface. The stepped portion 390 may include a region 392 concavely extending along an edge of the cover 320.

The audio output device 300 may inject the air adsorbents 370 through one first opening 302 and provide a passage through which air moves. The first opening 302 may operate as a vent hole while operating as an inlet of the air adsorbents 370. Since the air adsorbents 370 are injected through the first opening 302 and utilized as the vent hole, the opening formed in the audio output device 300 may be reduced. The audio output device 300 may include a cover for covering an opening. The audio output device 300 may reduce the cover by reducing the opening. According to the reduced cover, the audio output device 300 may reduce the area of the seating surface 380 on which the cover is disposed, thereby increasing a resonance space. The audio output device 300 may improve the sound pressure level of the low frequency band based on the increased resonance space.

Figure 5A:
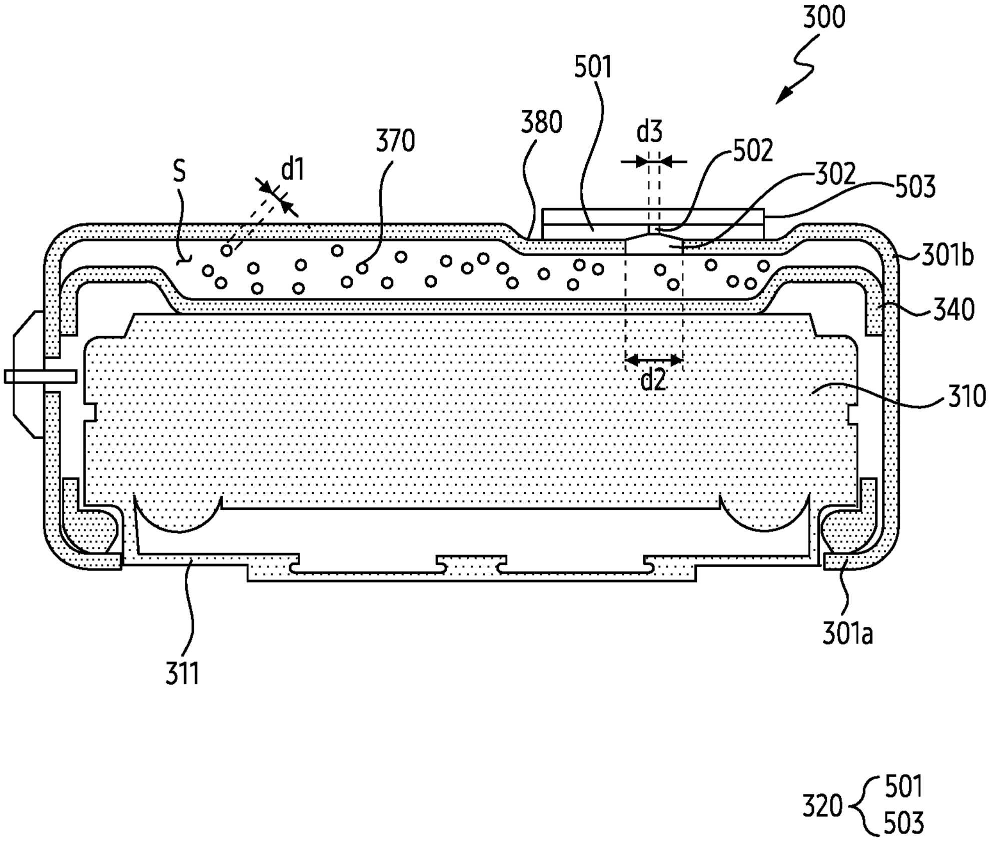
FIG. 5A is a cross-sectional view of the audio output device of FIG. 3 cut along line A-A', according to an embodiment of the disclosure.
Figure 5B:
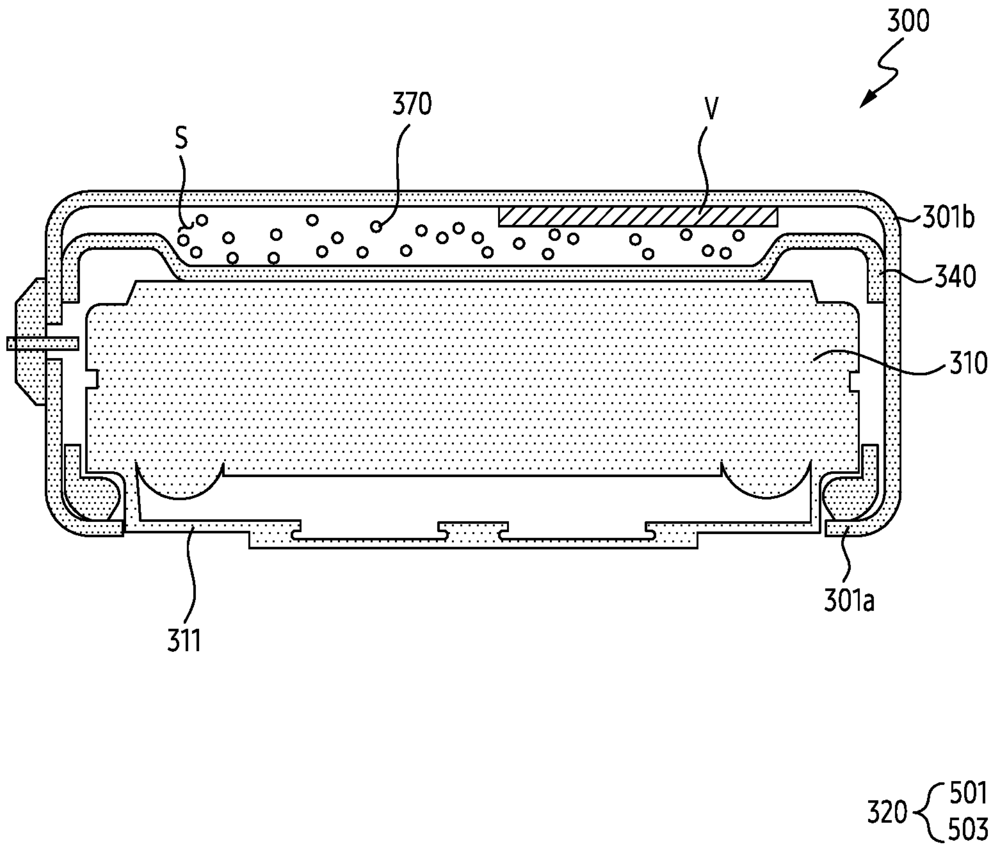
FIG. 5B is a cross-sectional view of the audio output device of FIG. 3 cut along line B-B', according to an embodiment of the disclosure.
Figure 6:
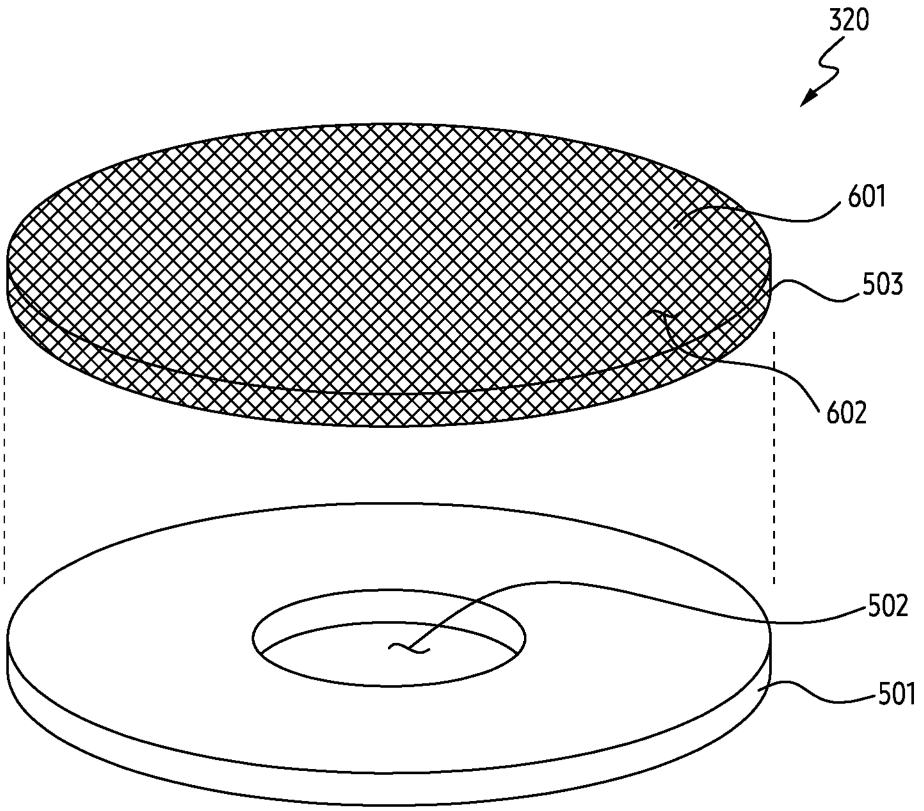
FIG. 6 is a view illustrating an example of an adhesive member and a mesh layer attached to an audio output device according to an embodiment of the disclosure.

FIG. 5A is a cross-sectional view of the audio output device of FIG. 3 cut along line A-A', according to an embodiment of the disclosure. FIG. 5B is a cross-sectional view of the audio output device of FIG. 3 cut along line B-B', according to an embodiment of the disclosure. FIG. 6 is a view illustrating an example of an adhesive member and a mesh layer attached to an audio output device according to an embodiment of the disclosure.

Referring to FIGS. 5A, 5B, and 6, the audio output device 300 may include a speaker 310, and a case 301 surrounding the speaker 310 and including a resonance space and a first opening 302 connected to the resonance space therein. The case 301 may include a first enclosure 301*a* and a second enclosure 301*b* including holes exposing the diaphragm 311 to the outside. The first enclosure 301*a* may be coupled to the second enclosure 301*b* to provide a space in which the speaker 310 is seated.

The audio output device 300 may further include the plurality of air adsorbents 370 disposed within the speaker. The air adsorbents 370 may be disposed in a resonance space S. The resonance space S may be formed by the support member 340 and the second enclosure 301*b*. The air adsorbents 370 may substantially expand the resonance space S. The air adsorbents 370 may improve audio performance by introducing air into the resonance space S.

The resonance space S may be surrounded through the case 301 and a surface different from the surface on which the audio signal of the speaker 310 is emitted. For example, the resonance space S may be surrounded by the rear surface of the speaker 310 and the second enclosure 301*b*. The resonance space S may be configured to provide resonance of an audio signal of a designated band emitted from the speaker.

The first opening 302 may be a passage through which the air adsorbents 370 are injected. For example, the diameter d2 of the first opening 302 may be larger than the diameter d1 of each of the plurality of air adsorbents 370. The plurality of air adsorbents 370 may be injected into the resonance space S through the first opening 302 larger than the diameter d1 of the plurality of air adsorbents 370. The diameter d2 of the first opening 302 may be 1.2 mm to 1.7 mm. The first opening 302 may have a diameter of approximately 1.5 mm or more.

The cover 320 may include an adhesive member 501 and a mesh layer 503. The adhesive member 501 may include a second opening 502 disposed on the first opening 302 and overlapping the first opening 302. The adhesive member 501 may attach the cover 320 to the second enclosure 301*b*. The adhesive member 501 may surround the first opening 302. The adhesive member 501 may include the second opening 502 to flow air through the first opening 302. The second opening 502 may have a size for preventing audio leakage. The diameter d3 of the second opening 502 may be smaller than the diameter d2 of the first opening 302. The diameter d3 of the second opening 502 may be approximately 0.4 mm to 0.6 mm. The diameter d3 of the second opening 502 may be about 0.5 mm to prevent the audio of the speaker 310 from leaking. The diameter d3 of the second opening 502 may be smaller than diameter d1 of each of the plurality of the air adsorbents 370. After the plurality of the air adsorbents 370 are injected into the resonance space S through the first opening 302 of the second enclosure 301*b*, the second opening 502 smaller than the diameter d1 of each of the plurality of air adsorbents 370 may prevent the air adsorbents 370 from leaking to the outside. The second opening 502 may be configured to adjust the pressure within the case 301 by flowing air inside the case 301 and air outside the case 301. The second opening 502 may function as a vent hole. The first opening 302 and the second opening 502 may be aligned with each other. For example, when the second enclosure 301*b* is viewed from above, a portion of the first opening 302 may overlap the second opening 502. For example, an edge of the first opening 302 may surround the second opening 502. The edge of the first opening 302 may be spaced apart from the second opening 502 and formed along an edge of the second opening 502.

The cover 320 may include a mesh layer 503 disposed on the adhesive member 501 to cover the second opening 502. The mesh layer 503 may cover the second opening 502 to allow air to flow in and out of the resonance space S, and prevent the air adsorbent 370 within the resonance space S from flowing out through the first opening 302 or the second opening 502.

Referring to FIG. 6, the mesh layer 503 may include a wire 601 forming a mesh and a fine opening 602. The mesh layer 503 may include patterns of the wires 601 and the fine openings 602. Through the fine opening 602, the air outside the case 301 may be introduced into the resonance space S, or the air inside the case 301 may be leaked from the resonance space S to the outside of the case 301. The pressure inside the case 301 may be adjusted through the flow of air between the case 301 and the outside.

The adhesive member 501 may include a double-sided tape. One surface of the adhesive member 501 may be attached to one surface of the case 301. For example, one surface of the adhesive member 501 may be attached to the second enclosure 301*b*. The adhesive member 501 may cover the first opening 302. The other surface of the adhesive member 501 may be attached to the mesh layer 503. The mesh layer 503 may cover the second opening 502 of the adhesive member 501.

Referring back to FIG. 5A, in a cross section of the region including the first opening 302, the seating surface 380 for disposing the cover 320 may be further included. The seating surface 380 may include a groove recessed toward the speaker 310 from other surfaces of the second enclosure 301*b*. For example, the distance from the rear surface of the speaker 310 to the seating surface 380 may be shorter than the distance from the rear surface of the speaker 310 to the outer surface of the second enclosure 301*b* except the seating surface 380. The width of the resonance space S disposed under the cover 320 surrounding the first opening 302 may be narrower than the width of the remaining resonance space S. The width of the resonance space S may be a distance between the second enclosure 301*b* and the support member 340 or the speaker 310.

Referring to FIG. 5B, in a cross section of a region not including the first opening 302, the groove for the cover 320 or the seating surface 380 may be omitted. The width of the resonance space S between the second enclosure 301*b* and the support member 340 may be maintained substantially constant. Since there is no separate seating surface 380, a resonance space as much as a space for forming the seating surface 380 may be ensured. For example, in order to form the seating surface 380 including the first opening 302, the resonance space S may be reduced. The depth of the seating surface 380 may correspond to the thickness of the cover 320. Accordingly, the resonance space S may be reduced by the volume of the cover 320.

The audio output device 300 in which an air adsorbent inlet for injecting the air adsorbent and a vent hole for adjusting the pressure inside the case are configured as one unit may include one cover. For example, the volume V of the cover surrounding the vent hole may be used as a resonance space, by implementing the vent hole as the second opening 502 of the adhesive member 501 and removing the vent hole.

According to the above-described embodiment, the audio output device 300 may expand a resonance space within the audio output device 300 by integrally forming a vent hole and an air adsorbent inlet. The audio output device 300 may reduce the volume compared to other audio output devices with the same resonance space, and when disposed in the electronic device 200, space efficiency may be increased. The audio output device 300 may reduce the number of openings, thereby simplifying the process. The audio output device 300 may reduce the cover surrounding the opening, thereby increasing the reduction effect of the subsidiary material.

Figure 7:
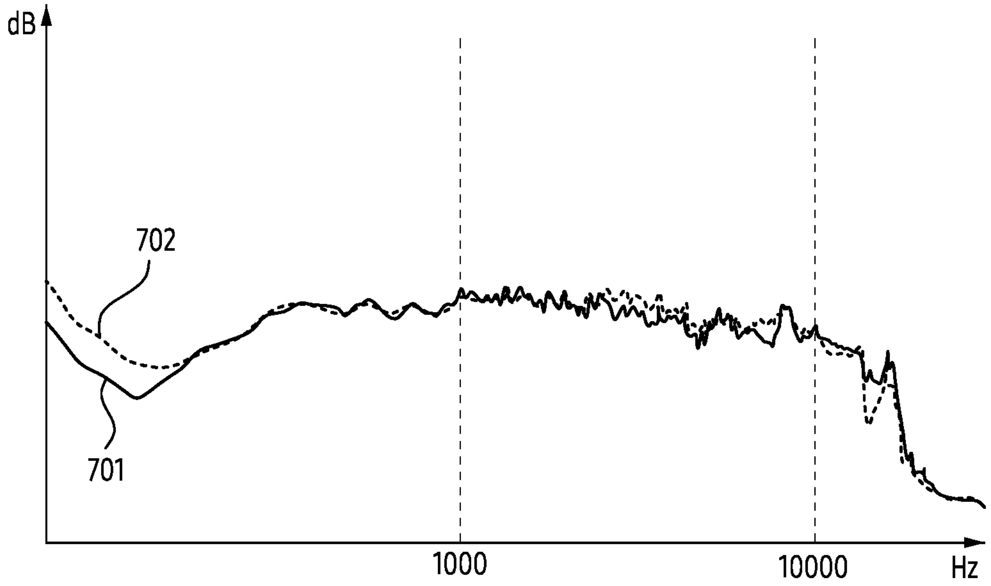
FIG. 7 is a graph comparing the performance of an audio output device with that of an audio output device of the related art, according to an embodiment of the disclosure.

FIG. 7 is a graph comparing the performance of an audio output device with that of an audio output device of the related art, according to an embodiment of the disclosure.

Referring to FIG. 7, a first graph 701 illustrates speaker characteristics of an audio output device of the related art. A second graph 702 illustrates speaker characteristics of the audio output device 300 according to an embodiment. The X-axis is the frequency of the audio signal provided, and the unit is Hz. The Y-axis indicates the magnitude of the audio signal, and the unit is dB.

At 1000 Hz to 10000 Hz of the audible frequency band, the graph 702 is formed higher than the graph 701. The audio output device 300 representing the graph 702 may improve the sound pressure level by further securing a resonance space. Through the improved sound pressure level of the low frequency band, the audio output device 300 may transmit improved audio to the user.

According to an embodiment of the disclosure, an audio output device (e.g., the audio output device 300 of FIG. 3) may include a speaker (e.g., the speaker 310 of FIG. 4). The audio output device may include a case (e.g., the case 301 of FIG. 3). The case may surround the speaker and include a resonance space therein. The case may include a first opening connected to the resonance space. The audio output device may include a plurality of air adsorbents (e.g., the air adsorbents 370 of FIG. 4). The plurality of air adsorbents may be disposed within the speaker. The audio output device may include an adhesive member (e.g., the adhesive member 501 of FIG. 5A) surrounding the first opening and including a second opening overlapping the first opening. The audio output device may include a mesh layer (e.g., the mesh layer 503 of FIG. 5A) that is attached to the case by the adhesive member and covers the second opening. A diameter of the first opening may be larger than a diameter of each of the plurality of air adsorbents. The diameter of the second opening may be smaller than the diameter of the first opening.

The audio output device according to the above-described embodiment may inject air adsorbents through one first opening and provide a passage through which air moves. The first opening may operate as a vent hole while operating as an inlet for air adsorbents. The opening formed in the audio output device may be reduced, by using the air adsorbents as the vent hole while injecting the air adsorbents through the first opening. The audio output device may include a cover for covering the opening. According to an embodiment, the audio output device may reduce the cover by reducing the opening. According to the reduced cover, the audio output device may reduce the portion of the seating surface on which the cover is disposed, thereby increasing the resonance space. The audio output device may improve the sound pressure level of the low frequency band through the increased resonance space. The above-described embodiment may have various effects including the above-described effects.

One surface of the case including the first opening may include a seating surface on which the adhesive member is seated. The seating surface according to the above-described embodiment may provide a space in which a cover including an adhesive member may be mounted. The above-described embodiment may have various effects including the above-described effects.

One surface of the case including the first opening may include a stepped portion (e.g., the stepped portion 390 of FIG. 3) disposed along a portion of an edge of the adhesive member.

The stepped portion 390 may extend from one side surface of the case to another side surface opposite to the one side surface, and may cross the case. The stepped portion may include a region (e.g., the region 392 in FIG. 3) concavely extending along an edge of the adhesive member.

An area of the second opening may be smaller than a cross-sectional area of each of the plurality of air adsorbents. Since the second opening is formed to be smaller than the plurality of air adsorbents, leakage of the air adsorbents may be reduced. The above-described embodiment may have various effects including the above-described effects.

The surface different from the surface from which the audio signal of the speaker is emitted and the case may form the resonance space.

The adhesive member may include a double-sided tape, and may be disposed between one surface of the case and the mesh layer. The adhesive member is made of a double-sided tape and may cover the second opening through a mesh layer. The above-described embodiment may have various effects including the above-described effects.

The resonance space may be configured to provide resonance of sound waves including an audio signal of a designated band emitted from the speaker.

The diameter of the first opening may be 1.2 mm to 1.7 mm, and the diameter of the second opening may be 0.4 mm to 0.6 mm. The first opening may introduce the air adsorbents, and the second opening may function as a vent hole. The above-described embodiment may have various effects including the above-described effects.

The second opening may be configured to adjust the pressure inside the case by flowing air inside the case and air outside the case.

The electronic device (e.g., the electronic device 200 of FIG. 2) may include a housing (e.g., the housing 230 of FIG. 2) including a speaker hole disposed on the side surface. The electronic device may include a speaker module (e.g., the audio output device 300 of FIG. 3) in the housing. The speaker module (e.g., the speaker 310 of FIG. 3) may include a speaker, a case (e.g., the case 301 of FIG. 3) including the speaker, a resonance space (e.g., resonance space S in FIG. 5A) in which the speaker is mounted, and a first opening (e.g., the first opening 302 of FIG. 3) connected to the resonance space. According to an embodiment, the speaker module may include a plurality of air adsorbents (e.g., the air adsorbents 370 in FIG. 4) disposed within the speaker. The speaker module may include an adhesive member (e.g., the adhesive member 501 of FIG. 5A). The adhesive member may include a second opening (e.g., a second opening 502 of FIG. 5A) disposed on the first opening and overlapping the first opening. The speaker module may include a mesh layer (e.g., the mesh layer 503 of FIG. 5A). The electronic device may include an audio duct for transmitting an audio signal from the speaker module through the speaker hole. According to an embodiment, the diameter of the first opening may be larger than the diameter of each of the plurality of air adsorbents. According to an embodiment, the diameter of the second opening may be smaller than the diameter of the first opening.

The audio output device according to the above-described embodiment may inject air adsorbents through one first opening and provide a passage through which air moves. The first opening may operate as an air adsorbents inlet and may operate as a vent hole. An opening formed in the audio output device may be reduced, by using as the vent hole while injecting the air adsorbents through the first opening. The audio output device may include a cover for covering the opening. According to an embodiment, the audio output device may reduce the cover by reducing the opening. According to the reduced cover, the audio output device may reduce the area of the seating surface on which the cover is disposed, thereby increasing a resonance space. The audio output device may improve the sound pressure level of the low frequency band through the increased resonance space. The above-described embodiment may have various effects including the above-described effects.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. In an embodiment, the computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to some embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An audio output device comprising:

a speaker;

a case surrounding the speaker and including a resonance space S in the case and a first opening connected to the resonance space S;

a plurality of air adsorbents disposed within the speaker;

an adhesive member disposed on the first opening and including a second opening overlapping the first opening; and a mesh layer disposed on the adhesive member and covering the second opening, wherein a diameter of the first opening is larger than a diameter of each of the plurality of air adsorbents, and wherein a diameter of the second opening is smaller than the diameter of the first opening.

2. The audio output device according to claim 1, wherein a surface of the case includes a seating surface along an edge of the first opening on which the adhesive member is seated.

3. The audio output device according to claim 1, wherein a surface of the case includes a stepped portion disposed along a portion of an edge of the adhesive member.

4. The audio output device according to claim 3, wherein the stepped portion extends from a side surface of the case to another side surface opposite to the side surface, and wherein the stepped portion includes a region concavely extending along the edge of the adhesive member.

5. The audio output device according to claim 1, wherein a diameter of the second opening is smaller than a diameter of each of the plurality of air adsorbents.

6. The audio output device according to claim 1, wherein the resonance space is surrounded with the case and a surface of the speaker opposite a surface from which an audio signal is emitted.

7. The audio output device according to claim 1, wherein the diameter of the first opening is 1.2 mm to 1.7 mm, and wherein the diameter of the second opening is 0.4 mm to 0.6 mm.

8. An electronic device comprising:

a housing including a speaker hole disposed on a side surface; and a speaker module in the housing, the speaker module including:

a speaker, a case surrounding the speaker and including a resonance space in the case and a first opening connected to the resonance space, a plurality of air adsorbents disposed within the speaker, an adhesive member disposed on the first opening and including a second opening overlapping the first opening, a mesh layer disposed on the adhesive member and covering the second opening, and an audio duct configured to transmit an audio signal from the speaker module through the speaker hole, wherein a diameter of the first opening is larger than a diameter of each of the plurality of air adsorbents, and wherein a diameter of the second opening is smaller than the diameter of the first opening.

9. The electronic device according to claim 8, wherein a surface of the case includes a seating surface along an edge of the first opening on which the adhesive member is seated.

10. The electronic device according to claim 8, wherein a surface of the case includes a stepped portion disposed along a portion of an edge of the adhesive member.

11. The electronic device according to claim 10, wherein the stepped portion extends from a side surface of the case to another side surface opposite to the side surface, and wherein the stepped portion includes a region concavely extending along the edge of the adhesive member.

12. The electronic device according to claim 8, wherein a diameter of the second opening is smaller than a diameter of each of the plurality of air adsorbents.

13. The electronic device according to claim 8, wherein the resonance space is surrounded with the case and a surface of the speaker opposite to a surface from which an audio signal is emitted.

14. The electronic device according to claim 8, wherein the adhesive member includes a double-sided tape, wherein a surface of the adhesive member is attached to a surface of the case, and wherein another surface of the adhesive member is attached to the mesh layer.

15. The electronic device according to claim 8, wherein the resonance space is configured to provide resonance of the audio signal of a designated band emitted from the speaker.

16. The electronic device according to claim 8, wherein the diameter of the first opening is 1.2 mm to 1.7 mm, and wherein the diameter of the second opening is 0.4 mm to 0.6 mm.

17. The electronic device according to claim 8, wherein the second opening is configured to adjust a pressure inside the case by flowing an air inside the case and an air outside the case.

18. The electronic device according to claim 8, wherein a diameter of the first opening is larger than a diameter of each of the plurality of air adsorbents.

19. The electronic device according to claim 8, wherein the case further comprises:

a first enclosure, and a second enclosure coupled to the first enclosure so as to provide a space in which the speaker is seated.

20. The electronic device according to claim 19, wherein the resonance space is a space formed between a rear surface of the speaker and the second enclosure.

* * * * *